US009119485B1

(12) United States Patent
DeLoach, Jr.

(10) Patent No.: US 9,119,485 B1
(45) Date of Patent: Sep. 1, 2015

(54) FOOTBALL WALL MOUNT ASSEMBLY

(71) Applicant: Thomas W. DeLoach, Jr., New Hill, NC (US)

(72) Inventor: Thomas W. DeLoach, Jr., New Hill, NC (US)

(*) Notice: Subject to any disclaimer, the term of this patent is extended or adjusted under 35 U.S.C. 154(b) by 264 days.

(21) Appl. No.: 13/832,748

(22) Filed: Mar. 15, 2013

(51) Int. Cl.
*A47F 7/00* (2006.01)
*F16M 13/02* (2006.01)

(52) U.S. Cl.
CPC . *A47F 7/00* (2013.01); *F16M 13/02* (2013.01)

(58) Field of Classification Search
CPC ........ A47F 7/00; B44C 5/0461; A47G 29/02; A63B 71/0036; F16M 13/02; Y10T 29/54
See application file for complete search history.

(56) References Cited

U.S. PATENT DOCUMENTS

| 2,551,354 | A | 5/1951 | Wasilevich | |
|---|---|---|---|---|
| 6,199,804 | B1 * | 3/2001 | Donofrio, Jr. | 248/121 |
| 6,601,711 | B1 | 8/2003 | Knable, III | |
| 7,500,570 | B2 | 3/2009 | Kurcheski | |
| 8,627,952 | B2 | 1/2014 | Glinert | |

OTHER PUBLICATIONS

Ball & Helmet Holders home page as found on Archive.org on Apr. 21, 2015. Archive.org asserts that this material was collected Aug. 28, 2008. Archive.org web page is found at https://web.archive.org/web/20080828034848/http://www.ballandhelmetholder.com/page. home. Printed onto four pages.
Perfect Cases web page as found on Archive.org on Apr. 21, 2015. Archive.org asserts that this material was collected on Mar. 13, 2013. Archive.org web page is found at https://web.archive.org/web/20130313140822/http://www.perfectcases.com/. Printed on one page in portrait and repeated enlarged on landscape to allow inspection of the ball holders.

* cited by examiner

*Primary Examiner* — Moshe Wilensky
(74) *Attorney, Agent, or Firm* — Kevin E. Flynn; Flynn IP Law

(57) ABSTRACT

A wall mount assembly for suspending a football near a wall to provide the illusion that the football is floating without support. The wall mount assembly having a lace engagement component for engaging with the laces of the football to hold the football to a wall engagement portion of the wall mount assembly. Lace engagement components can be selected to rotate the position of the laces from the top of the mounted football to closer to the wall behind the football if desired to display a signature on a football panel not adjacent to the laces.

14 Claims, 9 Drawing Sheets

FOOTBALL WALL MOUNT ASSEMBLY

BACKGROUND

Field of the Disclosure

This disclosure relates generally to a wall mount that allows the display of a football.

American football is one of several sports that uses a ball that is best described as a prolate spheroid which may defined as a spheroid with a polar axis (distance between the two tips of the ball) is greater than the equatorial diameter (diameter midway between the two tips). Sports that use a prolate spheroid shaped ball including American Football, Arena Football, Canadian Football, Rugby, and Australian Rules Football, among others. These balls are distinct from the ball known as a soccer ball in the United States which is a truncated icosahedron and not a prolate spheroid. While footballs used at the highest level of play and for commemorative purposes are made of a leather type material with separate lace material, there are also footballs made of a polymer (often called rubber) that are cast with the laces being protrusions in the cast surface rather than one or more components distinct from the leather panels.

FIG. 1 shows an American football such as the type used in the National Football League. The football 100 has a first pole 104 and a second pole 108. The football has four panels 116 that are separated by seams 112. The football 100 has a set of laces 150 that are gripped by the person throwing the football 100. The set of laces 150 has one or more longitudinal laces 154 which straddle the equator of the football. The equator 120 on the football would be the latitude that is halfway between the poles 104 and 108. A set of latitudinal laces 158 cross the longitudinal laces 150 at the ends and at several places along the longitudinal laces 154. The latitudinal laces 158 are substantially orthogonal with the longitudinal laces 154

To provide context for this disclosure, it is useful to give an approximate size and weight for a football. According to the NFL Rule 2, section 1, the ball must be from a specified supplier and bear the signature of the commissioner of the NFL, but more relevant to this application the football must be an inflated 12½ to 13½ pound urethane bladder enclosed in a pebble grained, leather case (natural tan color) without corrugations of any kind. It shall have the form of a prolate spheroid and the size and weight shall be:

long axis: 11 to 11¼ inches;
    long circumference: 28 to 28½ inches;
    short circumference: 21 to 21¼ inches.
    weight: 14 to 15 ounces.

Regulation sized footballs used in an NCAA-regulated college football game are roughly:

long axis: 10½ to 11½ inches;
    long circumference: approximately 28 inches; and
    short circumference: approximately 21 inches.

The average is approximately 11.5 inches long by 6.7 inches in diameter. An NCAA football differs from the NFL ball in that it has two 1-inch white stripes that are three to three and one-quarter inches from either end of the ball and located only on the two panels adjacent to the laces. It can be up to one-half inch shorter along the long axis, but only slightly narrower than NFL balls.

There may be special commemorative balls that are of a different size, or balls intended for younger players that are smaller than the NCAA or NFL footballs. Footballs used in other types of football may have different aspect ratios (length to diameter).

There are a number of reasons why a person may wish to display a football rather than to simply store it with other outside gear. The football may have been the specific football used in an event of some significance such as a ball that was the $200^{th}$ catch by a particular receiver, or the game ball awarded to a star player in a college game.

Frequently, the football is not in compliance with all the rules to be a game ball but is instead a commemorative football. Many of these commemorative balls are regulation size but are provided with coloring, text, or emblems not found on a regulation ball. There are many different types of commemorative footballs. The football may be a special commemorative ball noting a special event such as a bowl game appearance. The football may have special coloring or other markings that notes that it is a football associated with a particular college (NCAA) or professional (NFL) team.

The football (commemorative or regulation ball) may be signed by a player or football coach and thus have significance much like any other autograph from a famous person.

SUMMARY OF THE DISCLOSURE

Aspects of the teachings contained within this disclosure are addressed in the claims submitted with this application upon filing. Rather than adding redundant restatements of the contents of the claims, these claims should be considered incorporated by reference into this summary.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provide below as one of skill in the art will recognize that inventive concepts illustrated in various examples can be combined together in order to address a specific application.

Other systems, methods, features and advantages of the disclosed teachings will be or will become apparent to one with skill in the art upon examination of the following figures and detailed description. It is intended that all such additional systems, methods, features and advantages be included within the scope of and be protected by the accompanying claims.

BRIEF DESCRIPTION OF THE FIGURES

The disclosure can be better understood with reference to the following figures. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1:
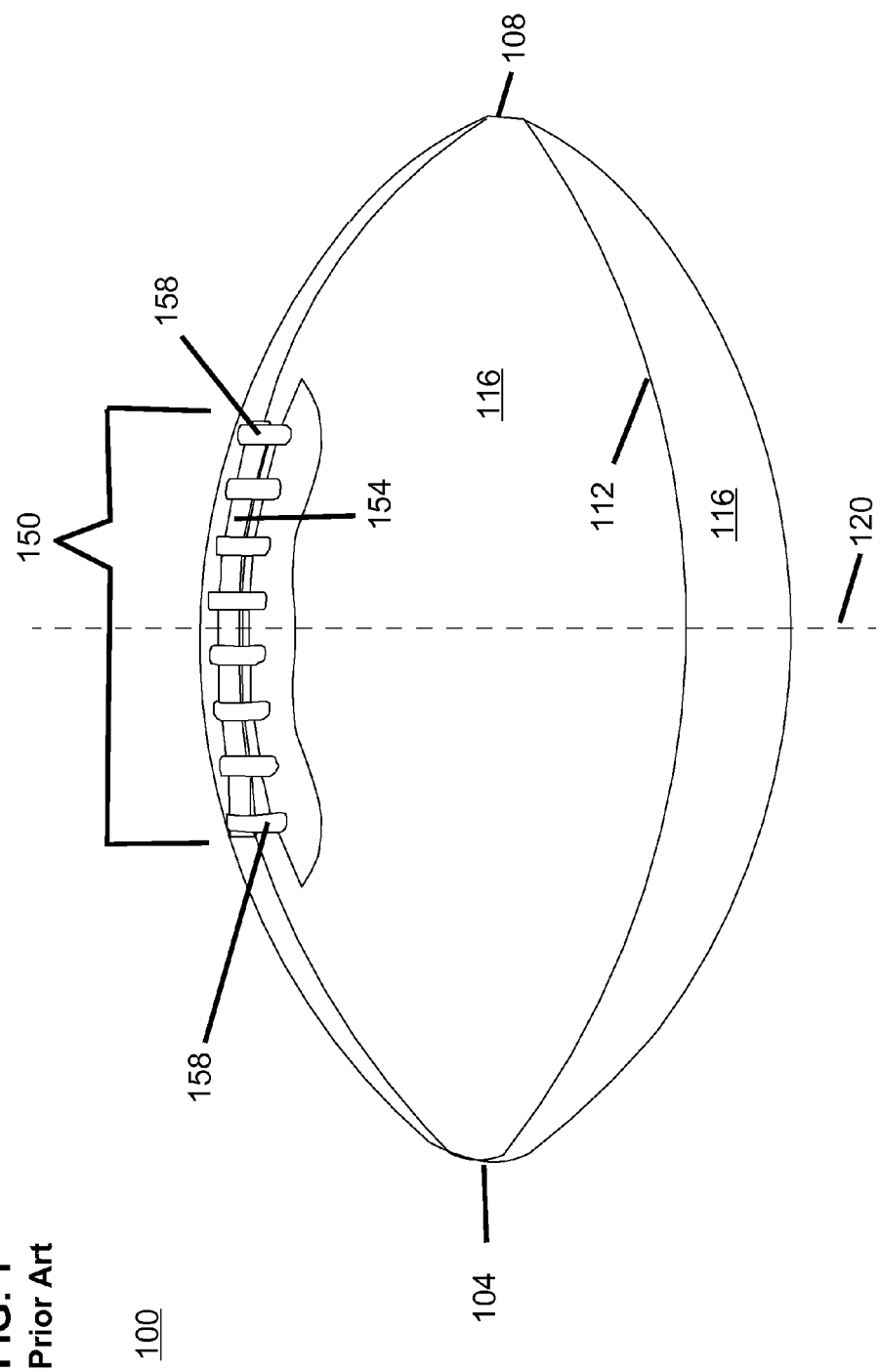
FIG. 1 shows an American football such as the type used in the National Football League.
Figure 2:
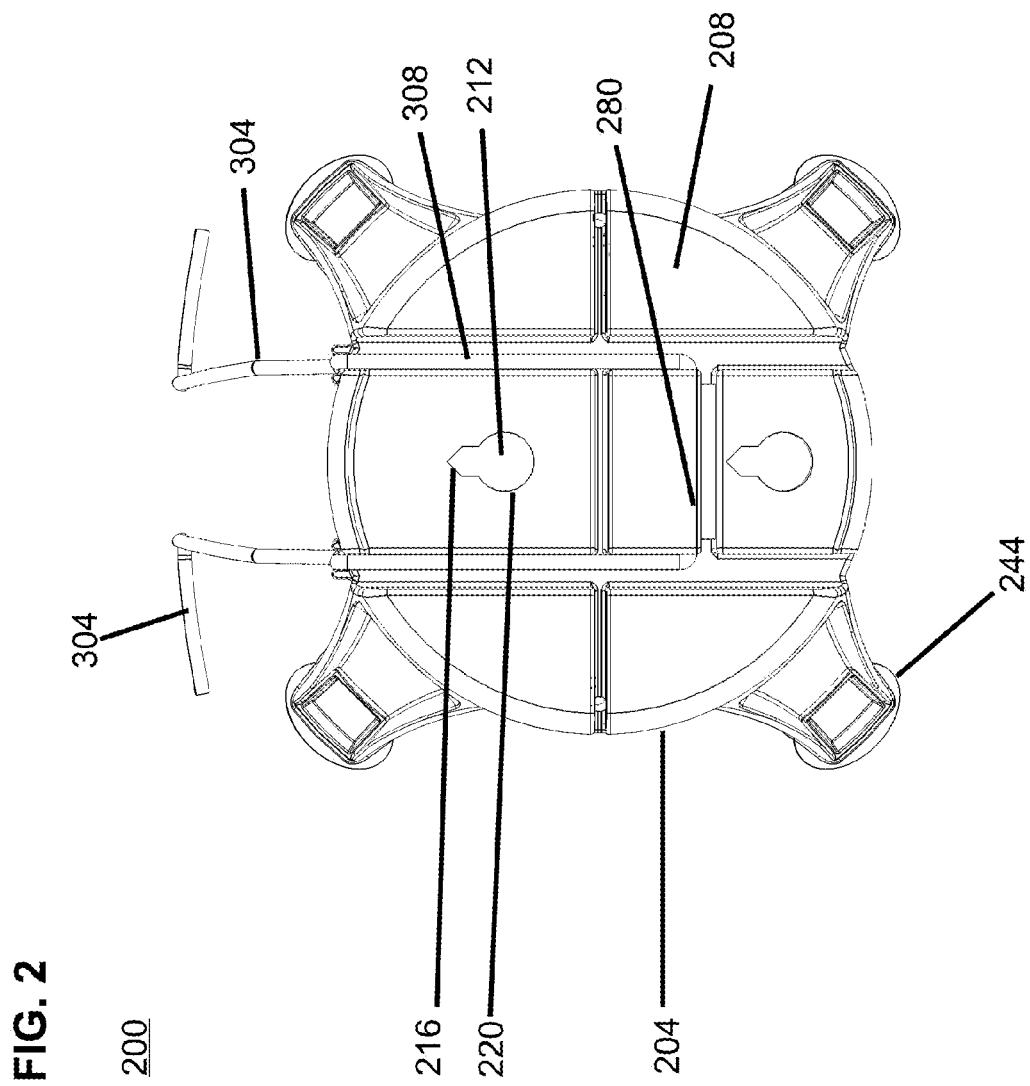
FIG. 2 shows a rear perspective view of a wall mount assembly 200 with a wall mount component 204 and a lace engagement component 304.

FIG. 2 shows a rear perspective view of a wall mount assembly 200 with a wall mount component 204 and a lace engagement component 304. The wall mount component 204 has a wall-facing side 208 to allow the wall mount component 204 to be placed flush against the wall. The wall mount component 204 may have one or more fastener engaging slots 212 that allow the wall mount component 204 and a football engaged with the lace engagement component 304 to fit over the head of a fastener (such as a screw head).

Frequently the smaller portion 216 of the one or more fastener engaging slots 212 is placed directly above the larger portion 220 of the fastener engaging slots 212, but the orientation of the smaller portion 216 to the larger portion 220 may deviate plus or minus a small amount degrees from purely vertical alignment. Given the engagement of the lace engagement component 304 with the wall mount component 204, the angle of the longitudinal centerline which runs internal to the football from the first pole 104 to the second pole 108 will be substantially orthogonal with the axis of the smaller portion 216 to larger portion 220.

The wall mount component 204 has a ball facing side 240 (better seen in other figures) that is on the opposite side of the wall mount component 204 relative to the wall facing side 208. The ball facing side 240 may be in a variety of configurations but is preferably adapted to nestle the curved surface of the football near the equator 120 of the football 100.

One configuration for the ball facing side 240 is to have a set of fingers 244 extend outwards. While four fingers 244 are shown in FIG. 2, different numbers of fingers could be used. Using two fingers may be adequate, but most configurations are going to use three or more fingers for stability. The fingers may have finger tips that are partial hemispheres. Appropriate choices for the geometry of the ball facing side 240 may allow for footballs from more than one regulation size to be used with a particular wall mount assembly. For example, a football mount may be used with either an NFL regulation sized football or an NCAA regulation sized football. Other mount assemblies adapted for other types of footballs such as balls used in Rugby or reduced sized commemorative balls may have different geometries as it is not essential that any one mount assembly must accommodate all possible prolate spheroid balls.

Figure 3:
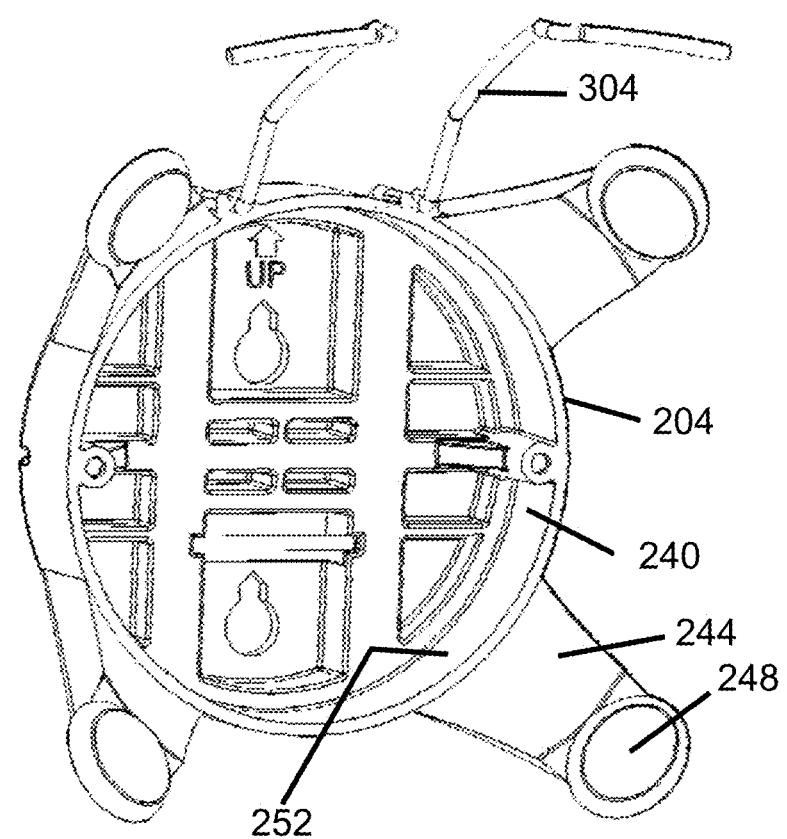
FIG. 3 shows a front perspective view of the wall mount component 204 and the lace engagement component 304.

FIG. 3 shows a front perspective view of the wall mount component 204 and the lace engagement component 304. The ball facing side 240 with four fingers 244, and four finger tips 248 are visible. A cavity 252 within the ball facing side 240 may be covered with a cavity cover (not shown here). The cavity may be used to store a set of batteries and electronics for use in providing sound or LED illumination to add another aspect to the display.

One of skill in the art will recognize that the activation of a light may be done by a switch or via alternatives such as sound activation, wireless controller, light sensor (so a flashlight beam toggles the light on and off) or other activation tools known in the art. Deactivation could be achieved in the same manner as activation. For a process that plays a college fight sound or some other sound upon activation, deactivation may not be necessary as the sound may automatically terminate after the end of a set duration.

A printed circuit board with some or all of the relevant electronics could serve as the cavity cover. This printed circuit board may extend beyond the perimeter of the cavity wall.

Figure 4:
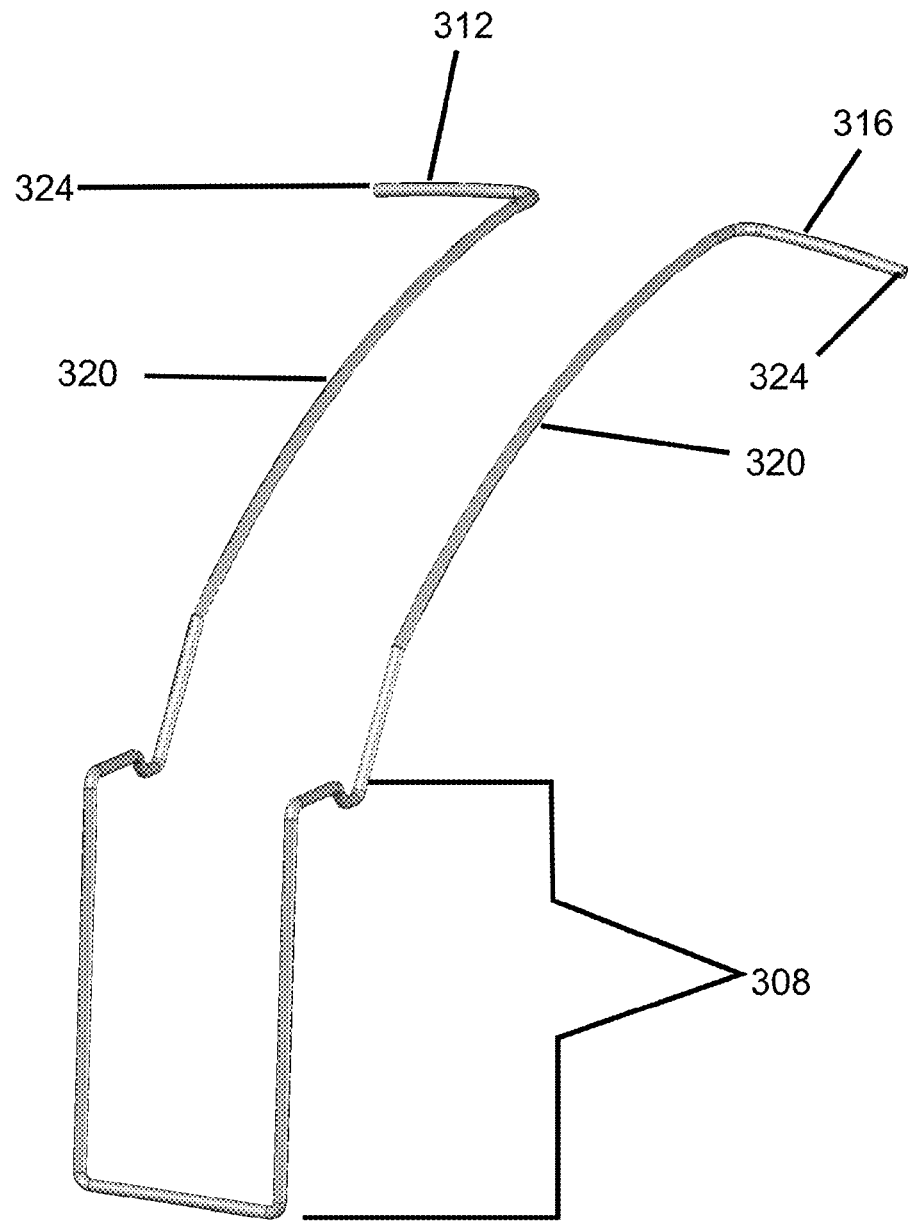
FIG. 4 is a rear side perspective view of lace engagement component 304.
Figure 5:
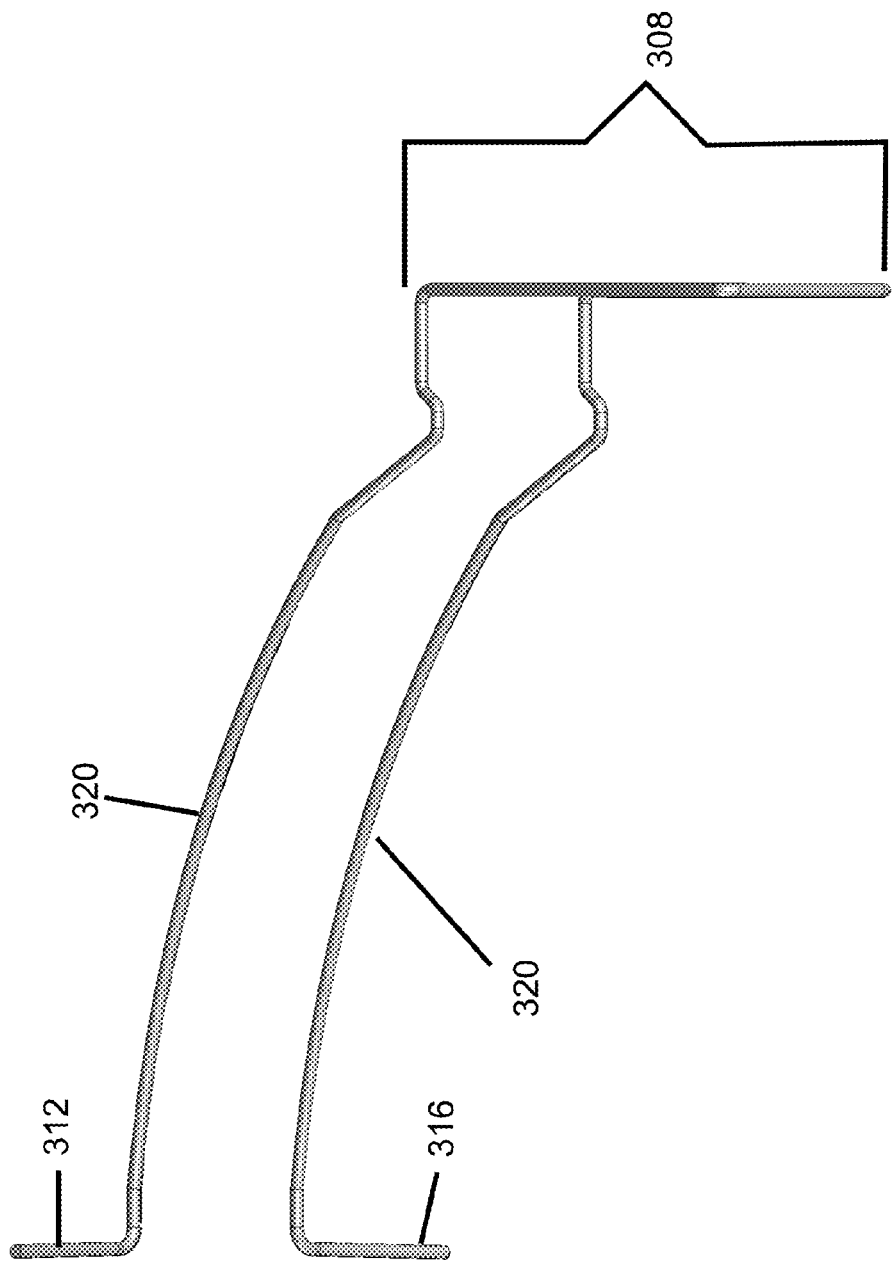
FIG. 5 is a bottom side perspective view of lace engagement component 304.

FIG. 4 and FIG. 5 show views of a lace engagement component 304. FIG. 4 is a rear side perspective view of lace engagement component 304. FIG. 5 is a bottom side perspective view of lace engagement component 304. The lace engagement component may be described as having a wall mount engagement 308, a set of one or more lace engaging fingers 312, 316 to engage one or more laces, and a set of spring portions 320 between the fingers 312, 316 and the wall mount engagement 308.

The lace engagement component 304 may be made from a range of suitable materials, preferably a material that will not oxidize or otherwise discolor the football 100 or laces 150. Stainless steel such as T302 tempered stainless steel is one suitable material.

Those of skill in the art will recognize that a variety of wire stock may be used although the choice of wire stock may influence other aspects of the design. Here are the qualities of one wire stock (Inter Wire Group of Armonk N.Y. item number 0800SSCL) that has provided suitable results.

Description: 0.080 T302 S/S CL.
Specification 1: ASTM-A313-08.
Specification 2: SAE-J230-94.
TENS STR MAX PSI—257,000.
TENS STR MIN PSI—249,000.

Figure 6:
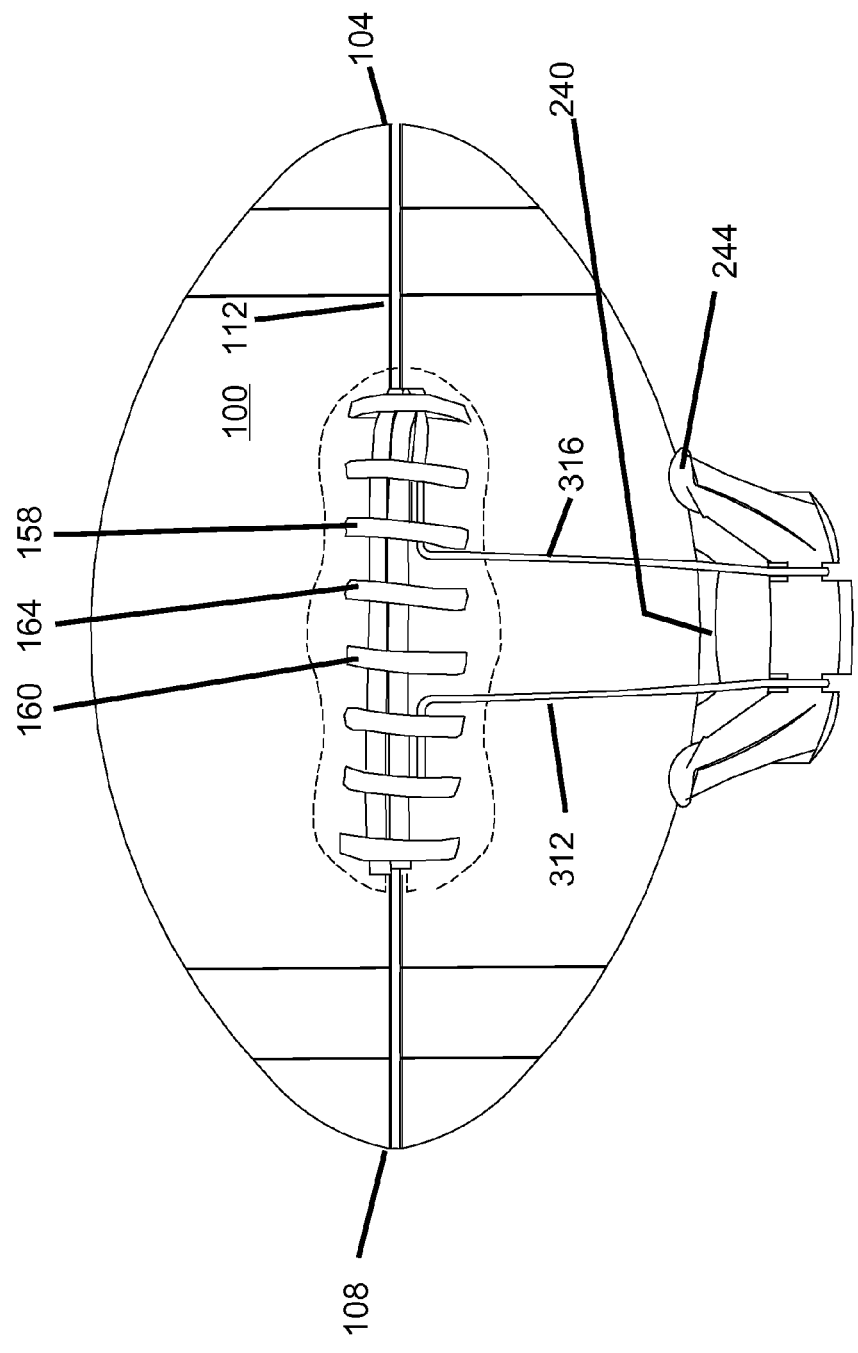
FIG. 6 is a top view of a football 100 engaged with a wall mount assembly 200 before the wall mount assembly 200 is placed over fastener heads protruding from a prepared wall.

FIG. 6 is a top view of a football 100 engaged with a wall mount assembly 200 before the wall mount assembly 200 is placed over fastener heads protruding from a prepared wall. A first seam 112 is essentially on the top of the football 100 as mounted. The a second seam, essentially 90 degrees offset from the first seam 112 runs among the fingers 244 extending from the ball-facing side 240 of the wall mount component 204. One of skill in the art will recognize that the weight of the football 100 will cause the football 100 to drop both the football 100 and the distal end of the lace engagement component 304 after the user releases an engaged football 100 after engagement with the wall mount. The lace engaging fingers 312 and 316 are shown engaged to two latitudinal laces 158 per lace engaging finger. To engage a lace engaging finger 312 or 316 with one or more latitudinal laces 158, the lace engaging finger 312 or 316 is moved by bending spring 320 and placing the tip 324 or 330 (FIG. 4) under the one or more latitudinal laces 158 to be engaged. Releasing spring 320 provides sustained engagement with the one or more latitudinal laces 158 as one would need to work against the spring 320 in order to disengage the lace engaging finger 312 or 316 from the engaged latitudinal laces 158.

Figure 7:
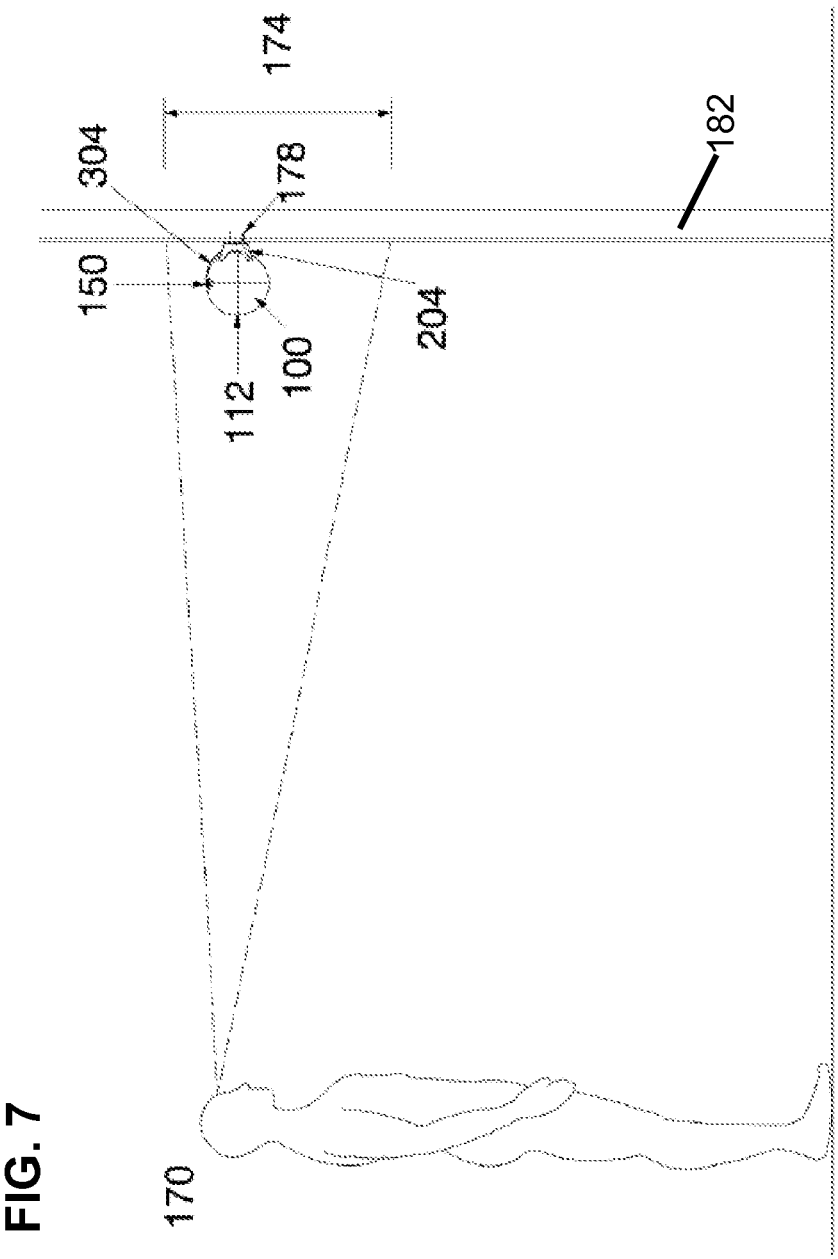
FIG. 7 shows an observer 170 looking at a football 100 that is engaged with a wall mount assembly 200.

FIG. 7 shows an observer 170 looking at a football 100 that is engaged with a wall mount assembly 200 with wall mount component 204 and lace engagement component 304 engaging a set of laces 150 on the top of the football 100. Fasteners 178 connected to wall 182 engage with the wall mount component 204 to suspend the football 100 in a manner that is not visible to observer 170 as the football 100 is between the observer 170 and the wall mount component 204 in this head on line of vision 174. The lace engaging fingers 312 and 316 may be set to engage latitudinal laces 158 on the wall side of the longitudinal laces 154 and thus should be obscured except when the observer 170 stands on a stool close to the wall 182 so that the observer 170 may view the football panel 116 located between the top of the football 100 and the wall 182. Even when the observer 170 is in such a position, the lace engagement component 304 is not very noticeable. The lace engagement component 304 may optionally be made with lace colored lace engaging fingers 312 and 316 and spring section 320 made to blend with brown leather or whatever color is used for a commemorative football. The football 100 shown in FIG. 6 has the NCAA white stripes on two panels as discussed above.

Process of Mounting the Football.

Step 1. Find a desired location where you would want to mount the football 100 on the wall 182.

Step 2. Place the wall mount component 204 against the wall 182 at the desired position including desired height from floor. Please note that the wall mount component 204 must be facing in the "UP" direction as noted on the wall mount component. Optionally, a stud sensor may be used to locate a wood stud to reduce the need for a dry wall anchor.

Step 3. Mark holes with a pencil through the smaller portion 216 of the fastener engaging slots 212. Remove the wall mount component 204 from the wall 182.

Step 4. Using a power drill and a 9/32" drill bit, drill holes into wall 182 through marks made in Step 3. Add wall anchors to dry wall if you did not drill into a wood stud.

Step 5. Using a power drill or screwdriver, drive provided screws into studs (or drywall anchors) wall mount component 204 to the wall 182. DO NOT tighten the screws to leave the wall mount component 204 easily removable from the wall 182 by using the fastener engaging slots 212 and sliding the wall mount component 204 upward releasing wall mount component 204 from the wall 182.

Step 6. Remove the sliding the wall mount component 204 upward releasing wall mount component 204 from the wall 182.

Step 7. Bend the spring portion 320 of the lace engagement component 304 as needed to guide the lace engaging fingers 312 and 316 through the latitudinal lace 158 as shown in FIG. 6. For a football 100 such as shown in FIG. 6, it may be desirable to engage the middle two latitudinal laces 158 in the four latitudinal on either side of the equator 120. Release spring portion 320.

Step 8. After engaging latitudinal laces 158 with the lace engaging fingers 312 and 316 of the lace engagement component 304, engage the wall mount engagement 308 of the lace engagement component 304 with the wall mount component 204 by guiding the wall mount engagement 308 into a slot 280 in the wall facing side 208 the wall mount component 204.

Step 9. Rotate the football 100 to allow viewing of the fastener engaging slots 212 with the screw heads protruding from the wall 182. After engaging the screw heads, slide the wall mount component 204 downward to secure the wall mount component 204 to the wall 182.

Step 10. Rotate the football 100 down allowing the football 100 to come to rest against the finger tips 248 of the wall mount component 204.

NOTE: It is possible that the football 100 will not make contact with all four finger tips 248 of the wall mount component 204 after mounting as the rigidity of the wire in the lace engagement component 304 support the weight of the football 100 to hold the football 100 in a proper vertical orientation. Depending on the stiffness of the lace engagement component 304, the football 100 may make contact with all, some, or none of the finger tips 248 of the wall mount component 204. Thus, a designer may choose to have a wall mount component that lacks fingers 244 and rely on the stiffness of the lace engagement component 304 to hold the football 100 out from the wall.

Step 11. Step back and enjoy viewing the collectible football 100 that now appears to be suspended without support near the wall 182 as the wall mount component 204 is hidden from view by the football 100.

Alternatives and Variations.

Short Wire for Autographed Footballs

Figure 8:
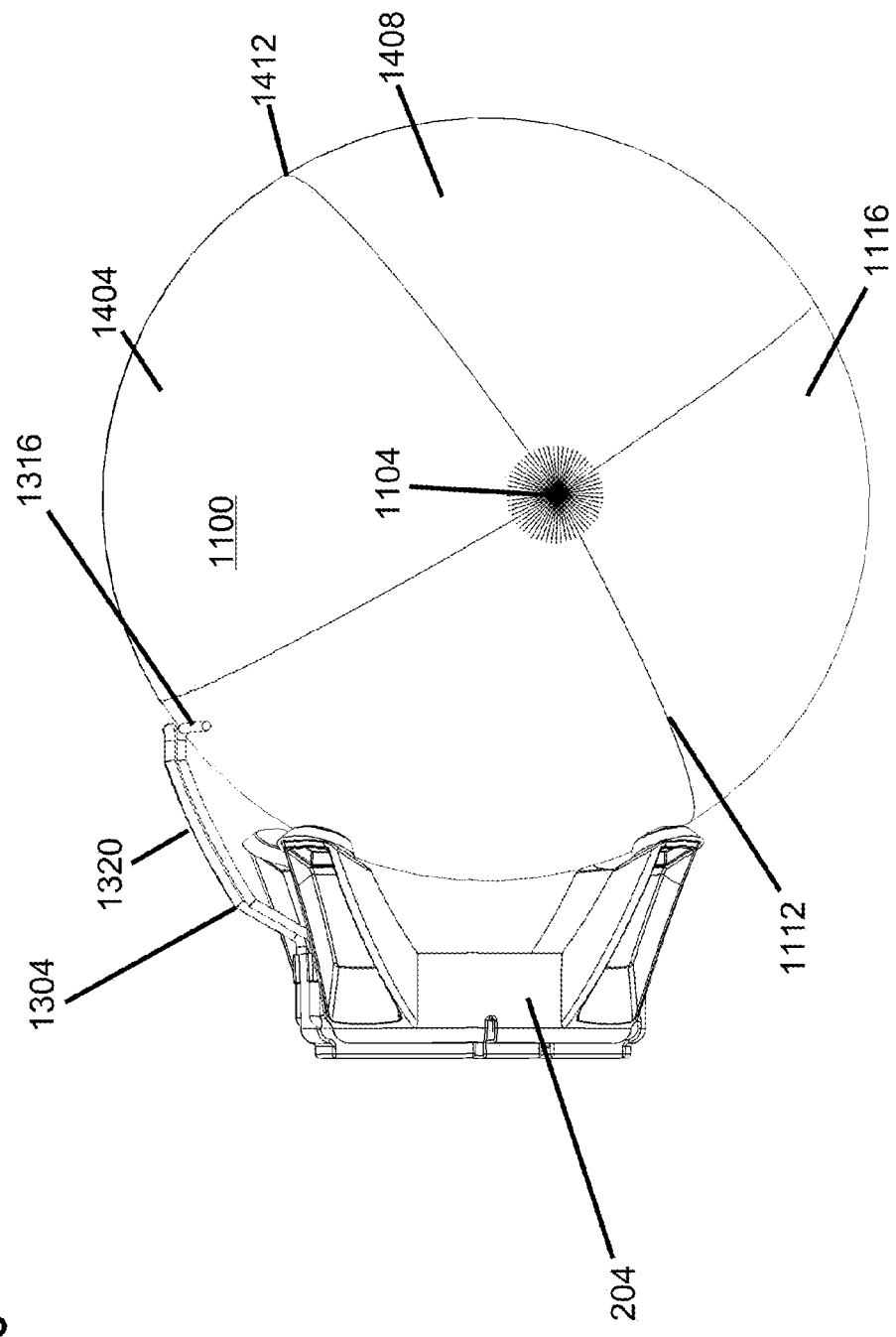
FIG. 8 shows an alternative lace engagement component designed to display an autographed or otherwise annotated football.

FIG. 8 shows a computer aided drafting image of a football 1100 (without laces in this model) engaged with an alternative to lace engagement component 304 discussed above. This short wire lace engagement component 1304 is designed to engage laces not at the top of the football as discussed above but partially rotated towards the wall. This rotation allows panel 1404 which would typically have the insignia for the NFL, NCAA, or other relevant insignia for this football 1100 and panel 1408 which is typically unadorned when manufactured. This panel 1408 provides a place for a signature or other markings (such as Game Ball 2012 Champion Game) or other annotations. Rotating the laces towards the wall mount 204 to display the signature or other annotations on panel 1408 may be desired by some users for some footballs 1100. Thus, a portion of the seam 1412 on the top side of panel 1408 is well above the longitudinal axis of the football 1100 that runs from pole 1104 to the opposite pole (not seen in FIG. 8).

Figure 10:
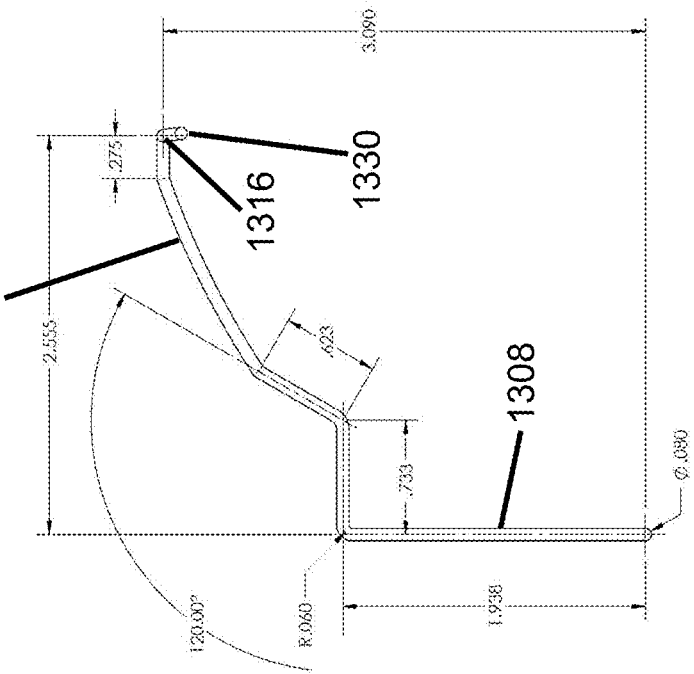
FIG. 10 shows a side view of short wire lace engagement component.
Figure 9:
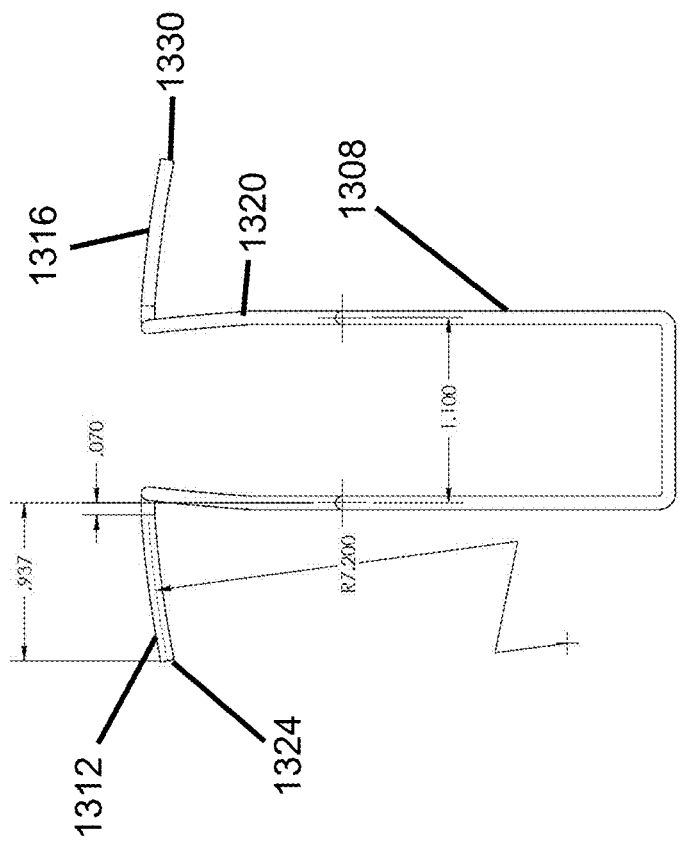
FIG. 9 shows a back view of short wire lace engagement component.

FIG. 9 shows a view of short wire lace engagement component 1304 as viewed from the wall looking towards an engaged football 100. FIG. 9 provides a side view of the same short wire lace engagement component. Visible in FIG. 9 and FIG. 10 are: the wall mount engagement section 1308, lace engaging fingers 1312 and 1316 with tips 1324 and 1330, and spring section 1320. The geometry of the wall mount engagement section 1308 will need to cooperate with the wall mount component 204.

Kits.

It is advantageous to sell a single wall mount component 204 with a set of two or more lace engagement components (such as 304 or 1304) that have the capacity to work with the one wall mount component 204. This allows a purchaser of the wall mount kit to use the wall mount assembly to display a football 100 with the laces 150 on the top of the football 100 as shown in FIG. 7 or with the laces 150 rotated towards the wall mount component 204 to prominently display a lower panel with a signature or other notation.

A kit may include lace engagement components that are adapted for a football that has a different girth than found in the NCAA or NFL footballs, such as a rugby football or a smaller commemorative football. A kit may include screws and dry wall anchors.

Alternative Engagements with Laces

While the figures discussed above had lace engagement finger 312 engaged with different latitudinal laces 158 than were engaged by lace engagement finger 316, this is not a requirement in order to use the teachings of the present disclosure. As one of skill in the art will appreciate, the lace engagement component 304 could be designed to allow lace engagement finger 316 to engage latitudinal laces 160 and 164 (FIG. 6) and extend towards first pole 104 and allow lace engagement finger 312 to also engage latitudinal laces 160 and 164 and extend towards second pole 108.

One of skill in the art will appreciate that an alternative lace engagement component 304 could be implemented to engage the longitudinal lace 154 in addition to or instead of engaging with one or more latitudinal lace 158. For example the lace engaging fingers 312 and 316 that are adapted to engage one or more of the latitudinal laces 158 could be replaced with hooks (not shown) which may be substantially "U" shaped, that would engage one or more of the longitudinal laces 154. However, the best use of the longitudinal laces 154 may be to help conceal lace engaging fingers 312 and 316 by routing the fingers under one or more of the longitudinal laces 154. In most instances, engaging with the latitudinal laces 158 provides the best resistance to gravity and keeps the football 100 secured better than alternative engagements with the longitudinal laces 154.

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

The invention claimed is:

1. A wall mount assembly for suspending a football for display,
    the football having:
        a prolate spheroid shape with a longitudinal axis defining two poles on opposite ends of the football, the football having a set of laces comprising:
        a set of one or more longitudinal laces starting at an equator of the football, equidistant between the two poles, and extending along a longitude towards each of the two poles; and
        and a set of latitudinal laces, orthogonal to the longitudinal laces, that extend to either side of the set of longitudinal laces;
    the wall mount assembly comprising:
        a wall mount component which has a flat face to be placed adjacent to a planar surface of a wall;
        the wall mount component sized to allow a football engaged with the wall mount assembly placed between the wall mount component and a pair of eyes of an observer to hide the wall mount component from the observer; and
        the wall mount component having a ball-facing side adapted to engage a portion of the football above and below the equator;
        a lace engagement component with a wall mount engagement section to reversibly connect the lace engagement component to the wall mount component;
        a set of at least one lace engaging finger connected to the wall mount by a cantilever spring, the set of at least one lace engaging finger adapted for insertion between the set of laces and a prolate spheroid shaped portion of the football; and
        the cantilever spring shaped to connect the at least one lace engaging finger inserted into the set of laces to the wall mount engagement section reversibly connected to the wall mount component.

2. The wall mount assembly of claim 1 wherein the cantilever spring is shaped to allow connection of the at least one lace engaging finger inserted into the set of laces to the wall mount component located a nominal quarter rotation from the one or more longitudinal laces.

3. The wall mount assembly of claim 1 wherein the cantilever spring is shaped to allow the at least one lace engaging finger inserted into the set of laces to hold the set of laces rotated back towards the wall but above the wall mount component so that a panel of the engaged football not adjacent to the set of laces may be displayed.

4. The wall mount assembly of claim 3 wherein a portion of a top seam of the panel of the engaged football not adjacent to the set of laces at the equator of the football is above the longitudinal axis of the football.

5. The wall mount assembly of claim 1 wherein the set of at least one lace engaging finger has a pair of lace engaging fingers adapted to be compressed to reduce a distance between the pair of lace engaging fingers and then released to maintain engagement with at least one latitudinal lace such that opposition to a spring force must be exerted in order to disengage either lace engaging finger from the at least one latitudinal lace.

6. The wall mount assembly of claim 5 wherein the pair of lace engaging fingers may be used to engage a subset of latitudinal laces wherein both of the pair of lace engaging fingers are engaged with at least one of latitudinal laces in the subset of latitudinal laces.

7. The wall mount assembly of claim 1 wherein at least one of the set of at least one lace engaging finger is engaged with the set of one or more longitudinal laces.

8. The wall mount assembly of claim 1 wherein the wall mount component includes a set of fingers that extend outward make multipoint contact with portions of the football on a wall side of the suspended football.

9. The wall mount assembly of claim 8 wherein the wall mount component has a set of at least three fingers that extend outward to place rounded tips in contact with portions of the football on a wall side of the suspended football.

10. The wall mount assembly for suspending a football for display of claim 1 further comprising a football suspended for display.

11. A wall mount assembly for suspending a football for display,
    the football having:
        a prolate spheroid shape with a longitudinal axis defining two poles on opposite ends of the football, the football having a set of laces comprising:
        a set of one or more longitudinal laces starting at an equator of the football, equidistant between the two poles, and extending along a longitude towards each of the two poles; and
        and a set of latitudinal laces, orthogonal to the longitudinal laces, that extend to either side of the set of longitudinal laces;
    the wall mount assembly comprising:
        a wall mount component which has a flat face to be placed adjacent to a planar surface of a wall; and
        the wall mount component sized to allow a football engaged with the wall mount assembly placed between the wall mount component and a pair of eyes of an observer to hide the wall mount component from the observer;

a lace engagement component with a wall mount engagement section to reversibly connect the lace engagement component to the wall mount component;

a set of at least one lace engaging finger connected to the wall mount by a cantilever spring, the set of at least one lace engaging finger adapted for insertion between the set of laces and a prolate spheroid shaped portion of the football; and the cantilever spring shaped to connect the at least one lace engaging finger inserted into the set of laces to the wall mount engagement section reversibly connected to the wall mount component to suspend football engaged with the wall mount assembly without the suspended football touching the wall mount component.

12. The wall mount assembly for suspending a football for display of claim 11 further comprising a football suspended for display.

13. A wall mount assembly kit for creating a wall mount assembly for suspending a football for display, the football having:
- a prolate spheroid shape with a long axis defining two poles on opposite ends of the football, the football having a set of laces comprising:
  - a set of one or more longitudinal laces starting at an equator of the football, equidistant between the two poles, and extending along a longitude towards each of the two poles; and
  - and a set of latitudinal laces, orthogonal to the longitudinal laces, that extend to either side of the set of longitudinal laces;

the kit comprising:
- a wall mount component which has a flat face to be placed adjacent to a planar surface of a wall;
- the wall mount component sized to allow a football engaged with the wall mount assembly placed between the wall mount component and a pair of eyes of an observer to hide the wall mount component from the observer;
- the wall mount component having a ball-facing side adapted to engage a portion of the football above and below the equator;
- a set of at least two lace engagement components, each lace engagement component having
- a wall mount engagement section;
- a set of at least one lace engaging finger connected to the wall mount engagement section by a cantilever spring, the set of at least one lace engaging finger adapted for insertion between the set of laces and a prolate spheroid shaped portion of the football;
- the cantilever spring shaped to allow connection of the at least one lace engaging finger inserted into the set of laces to the wall mount component;
- with at least one lace engagement component adapted to suspend a football with the laces on a top portion of the engaged football; and
- at least one lace engagement component adapted to suspend a football with the laces rotated away from the top towards the wall mount component so that a panel of the football not adjacent to the laces is prominently displayed.

14. The wall mount assembly kit of claim 13 further comprising the football for display.

* * * * *